Figure 2:
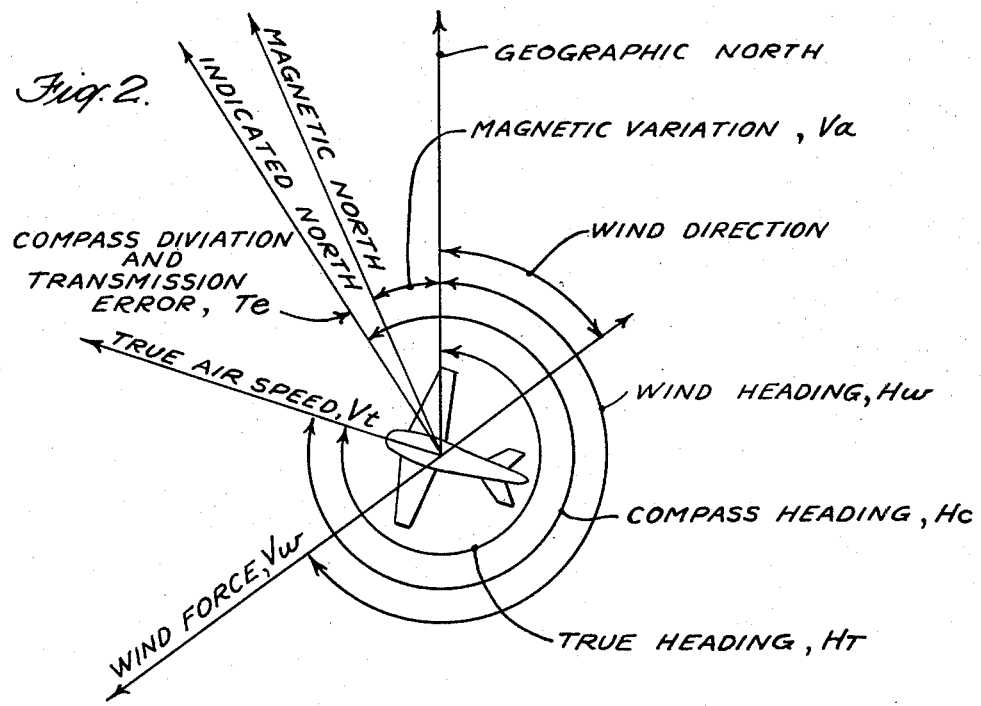

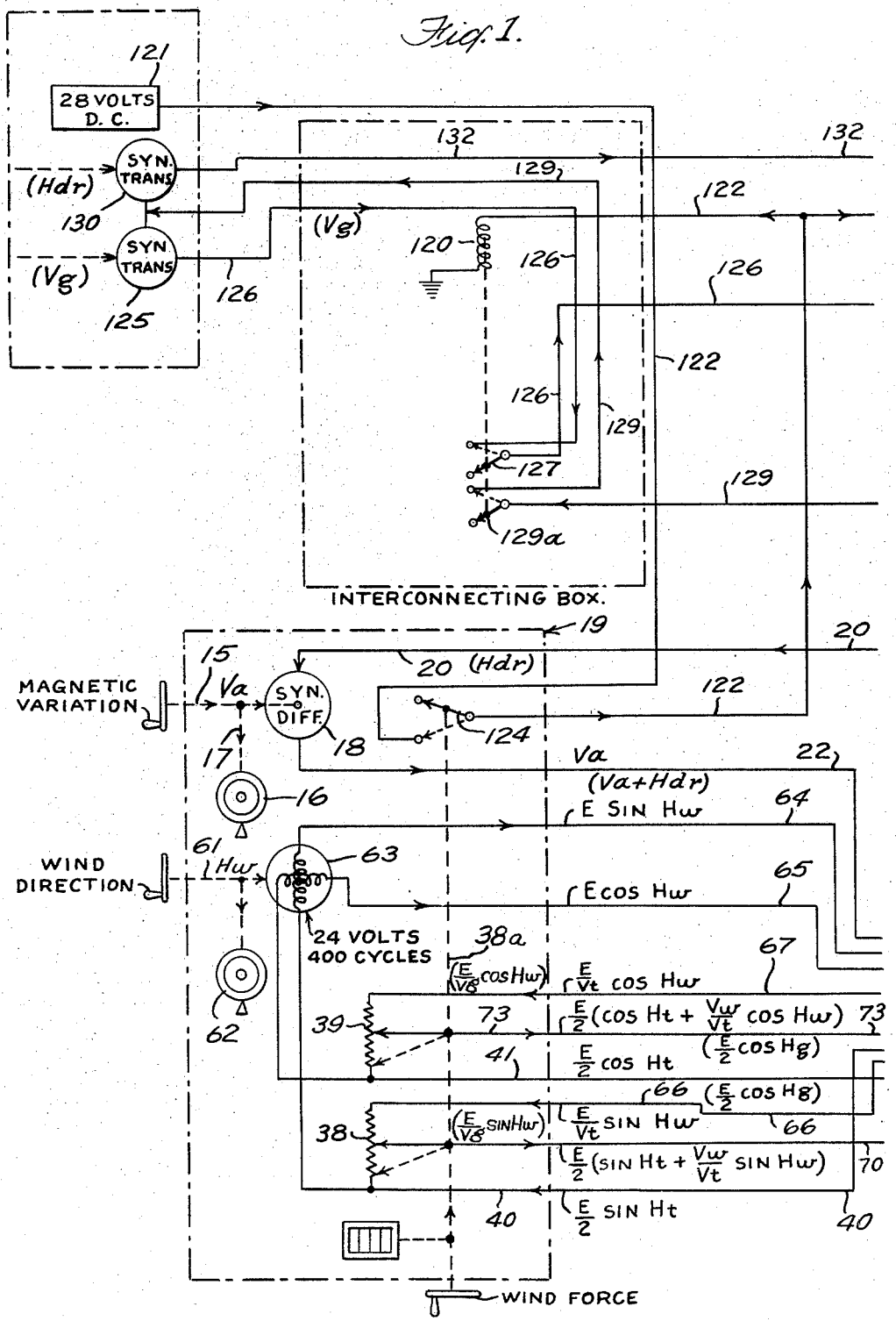

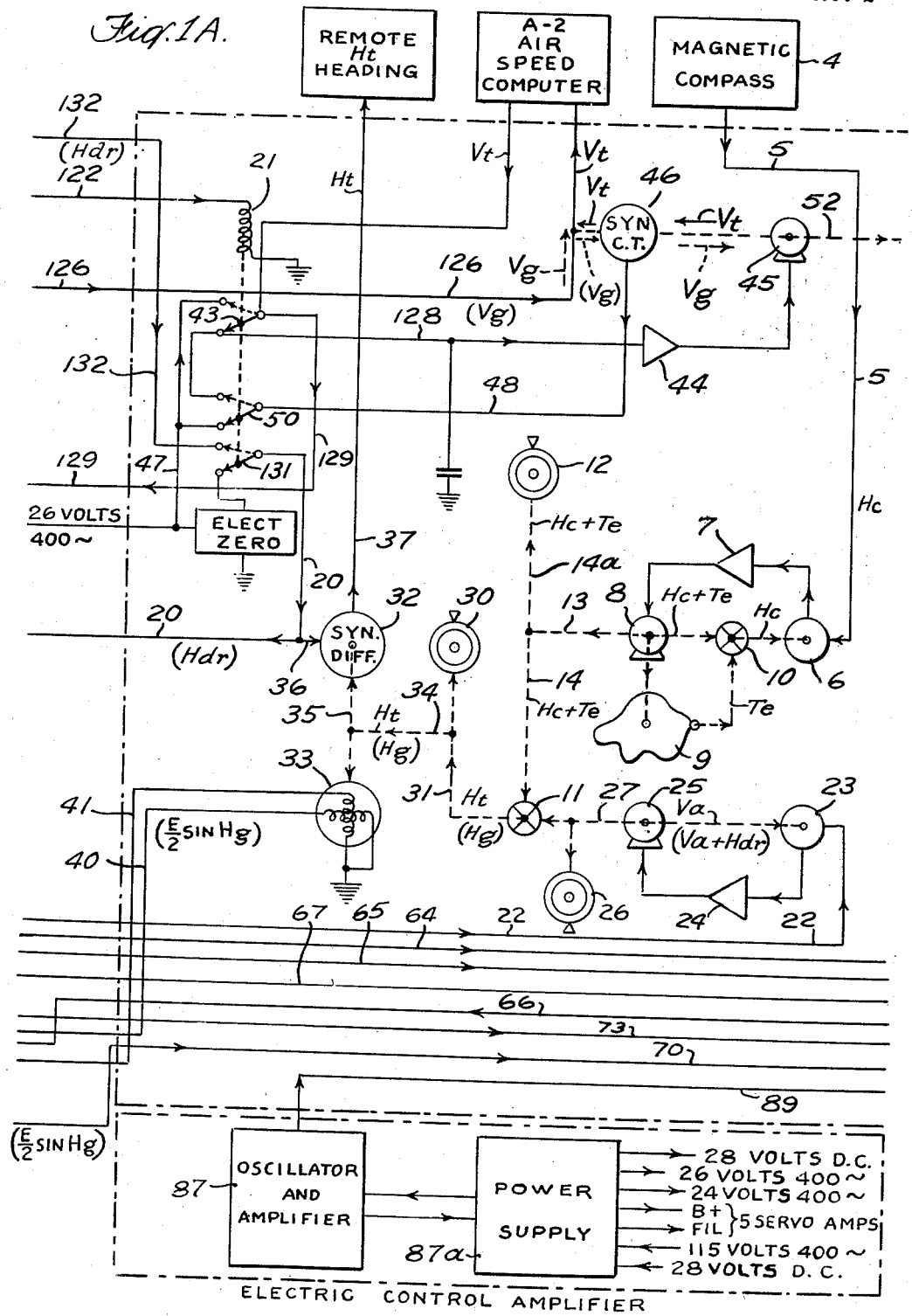

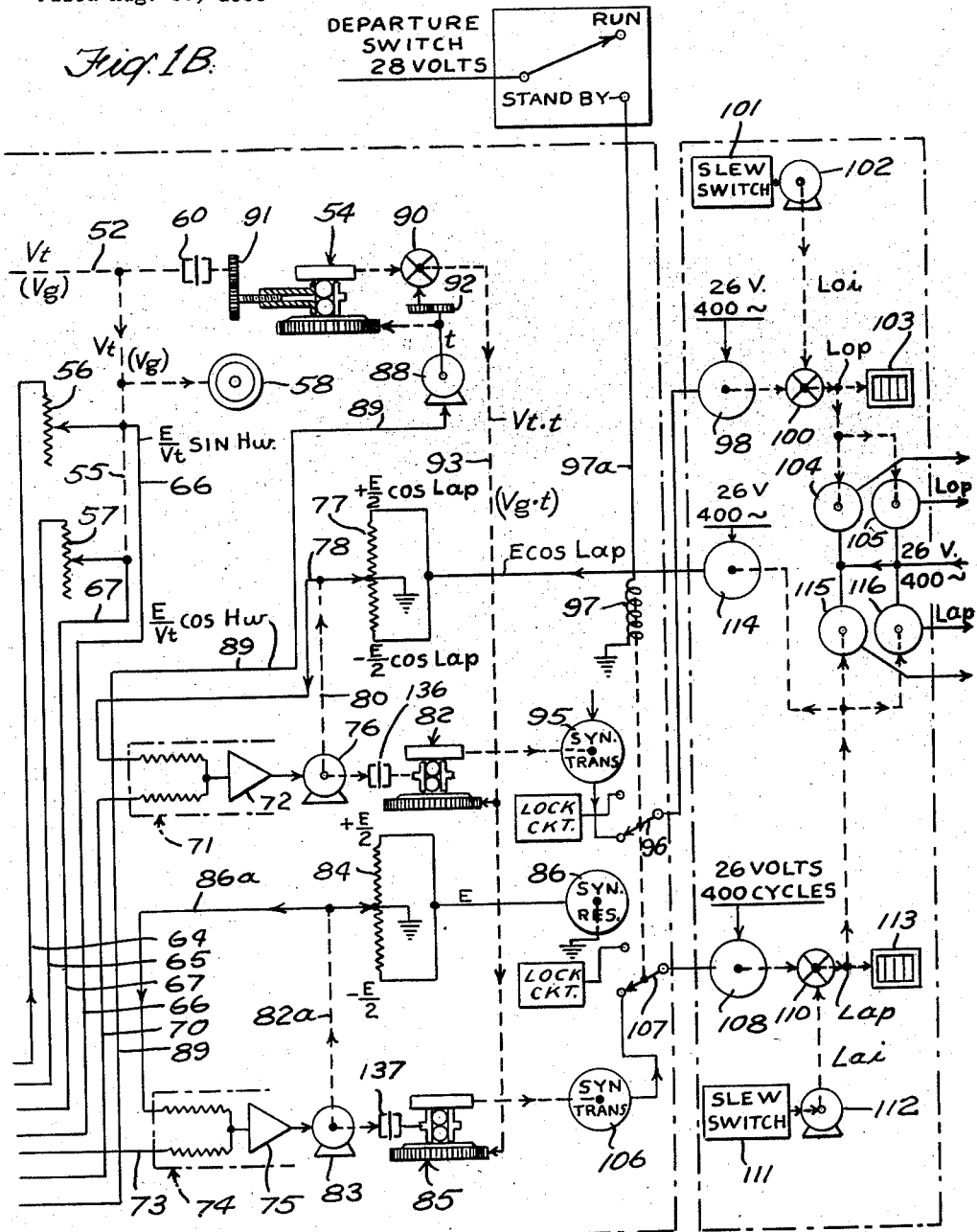

United States Patent Office 2,951,639
Patented Sept. 6, 1960

2,951,639

GROUND POSITION INDICATOR SYSTEM

Henry F. McKenney, Greenwich, Conn., George A. Lieske, Bayside, and John M. Scutt, Little Neck, N.Y., and Rodney W. Unold, Fort Lee, N.J., assignors to Sperry Rand Corporation, Ford Instrument Company Division, Long Island City, N.Y., a corporation of Delaware Filed Aug. 30, 1956, Ser. No. 607,101

3 Claims. (Cl. 235—187)

This invention relates to a navigation computer for determining the preesnt position of aircraft. It is capable of two modes of operation hereinafter referred to as normal mode and ground speed mode. Solutions of present position are made on the basis of data furnished by the manual insertion of variables in addition to those furnished by automatic transmission from equipment in the aircraft. In the normal mode the manual inputs of magnetic variation, wind force and wind direction in addition to the automatic inputs of air speed and magnetic compass heading are required for system operation. Alternatively, in the ground speed mode doppler radar is employed to make directly available to the computer values of ground speed and drift, while magnetic compass heading and magnetic variation are provided by automatic transmission and manual insertion, respectively.

One object of the computer is to provide mechanism for computing and indicating present latitudinal and longitudinal positions, Lap and Lop, in accordance with the following equations:

(1) $\quad Lap = Lai + \int_0^t \left( \cos Ht + \frac{Vw}{Vt} \cos Hw \right) Vt \cdot tdt$ (2) $\quad Lop = Loi + \int_0^t \left( \sin Ht + \frac{Vw}{Vt} \sin Hw \right) \sec Lap \, Vt \cdot tdt$ where Lai is initial latitude, Loi is initial longitude, H*t* is the true heading, V*w* is wind velocity, H*w* is wind heading, V*t* is air speed. The limit of integration, *t*, is the elapsed time required to cover the distance traveled from an initial ground position to computed present ground position. Special provision is made for determining the wind quotient, $$\frac{Vw}{Vt}$$

which introduces a variable scale factor to the computations and significantly contributes to the accuracy of the solutions, especially for reduced air speed.

Another object of the invention is to provide an alternative means for computing present position on the basis of inputs obtained from conventional doppler radar equipment. These solutions are made in accordance with the following formulae:

(3) $\quad Lap = Lai + \int_0^t \cos Hg \, Vg \cdot tdt$
(4) $\quad Lop = Loi + \int_0^t \sin Hg \sec Lap \, Vg \cdot tdt$ where V*g* is ground speed and H*g* is ground track of the aircraft. Special provision is made for converting from the normal or wind solution mode of operation of the computer to the radar or ground track mode by making wind force zero. It will be noted that the products V*t*·*t* and V*g*·*t* are required values for the normal and the ground speed modes of operation, respectively, integrator means being employed to supply them. In fact, the identical computer elements and arrangement thereof are employed for the two modes of solution, there being appropriate switching means provided to select the desired mode.

Another object of the invention is to provide an improved integrator system which is adapted to perform accurate multiplications although the input value which is employed to position the integrator carriage is relatively small.

Another object of the invention is to provide a new and improved secant computer.

Figure 3:
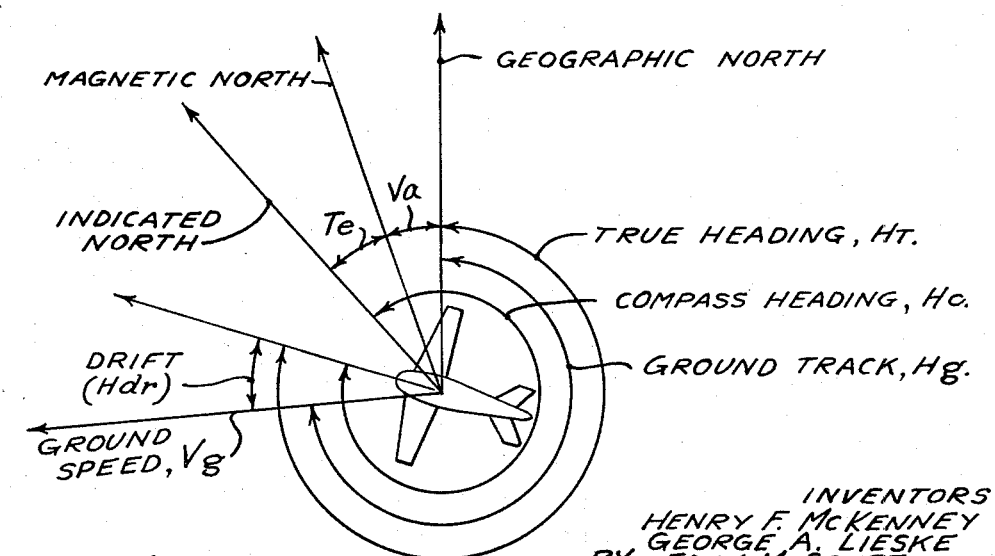

Other objects and advantages of the invention will be apparent on reading the following detailed description of the computer system taken in conjunction with the accompanying drawings, in which Figs. 1, 1A and 1B schematically show the basic computer arrangement;

Fig. 2 graphically shows the values required for the normal mode of operation; and Fig. 3 graphically shows the values required for the ground speed mode of operation.

According to the drawings a magnetic compass 4 feeds compass heading H*c* via transmission line 5 to a synchro control transformer 6, the output of which activates servo amplifier 7. This amplifier is employed to drive servo motor 8. A deviation cam compensator 9 is in operative connection with the motor 8 having adjustment screws (not shown) located at every 30° on its surface. Adjustment of these screws yields T*e*, the compass deviation and transmission error for a particular aircraft. The output of the cam 9 is placed in one side of differential 10, the other input to the differential 10 being connected to the motor 8. The differential is used to subtract the cam output from the motor output and feed the resulting quantity H*c* back to the synchro control transformer 6. It is apparent that the servo error will be nulled at such time as the motor output is equal to H*c*+T*e*. This function is transmitted by shaft 13 and shaft 14 as one input for differential 11 and by shaft 13 and shaft 14*a* to a two-speed check dial 12. In computer control box 19 magnetic variation V*a* is manually introduced on shaft 15 and transmitted to a two-speed dial 16 on shaft 17 and to synchro differential 18. When the system is operated in the normal mode, the electrical input for synchro differential 18 on lead 20 is electrical zero from circuits selected by relay 21 as explained below. The synchro output V*a* on line 22 is fed to a servo loop comprising synchro control transformer 23, servo amplifier 24 and servo-motor 25. The output of the servo loop is fed to a two-speed dial 26 and as a second input to differential 11 by shaft 27. The differential 11 adds H*c*+T*e* and V*a* to yield true heading H*t*, (5) $\quad\quad\quad Ht = Hc + Te + Vt$ The output H*t* of differential 11 is placed on two-speed dial 30 by means of shaft 31 and this output positions synchro differential 32 and synchro resolver 33 by means of connected shafts 34 and 35. The electrical input to differential 32 is electrical zero being placed therein by lead 20 and lead 36 and its output is transmitted to remote heading equipment on lead 37.

The electrical outputs of the resolver 33, the rotor of which is driven mechanically in accordance with the quantity H*t*, are $$\frac{E}{2} \sin Ht \text{ and } \frac{E}{2} \cos Ht$$

and are transmitted as bias voltages to potentiometers 38 and 39 in the computer control box 19 on leads 40 and 41, respectively.

Airspeed V*t* is provided by a type A-2 true air speed computer and transmitter. The V*t* transmitter switch 43 controlled by relay 21, servo amplifier 44, servo motor 45 and synchro control transformer 46 form a conventional closed servo loop for receiving $Vt$. The transformer 46 is energized by means of a 26 volt line 47 which is connected to input lead 48 through switch 50 which is also under the control of the relay 21. The rotor shaft 52 of servo motor 45 serves to position the carriage of integrator 54 and drives shaft 55 and linear divider potentiometers 56 and 57 thereby, with limit stop 60 on shaft 52 protecting the limited travel devices potentiometers 56 and 57 and integrator carriage 54. The quantity represented on shaft 55 is indicated by two-speed dial 58.

Wind direction $Hw$ is manually introduced on shaft 61, indicated on two-speed dial 62 and serves to drive synchro resolver 63 thereby computing $E \sin Hw$ and $E \cos Hw$, which are impressed across the divider potentiometers 56 and 57 by means of leads 64 and 65, respectively. The potentiometer 56 is connected to the potentiometer 38 in series by means of line 66 while the potentiometer 57 is series connected to potentiometer 39 through line 67. The electrical limits, resistance ratio, direction of rotation and setting of the potentiometers 56 and 57 are such that the voltage at the movable contact of potentiometer 56 is $$\frac{E}{Vt} \sin Hw$$

Wind force potentiometer 38 is excited by this voltage and produces at its movable contact the shaft 38$^a$ for which is settable in accordance with wind force $Vw$ a voltage referenced to its zero speed terminal equal to $$\frac{E}{2}\left(\frac{Vw}{Vt} \sin Hw\right)$$

Since the zero speed terminal of potentiometer 38 is biased by $$\frac{E}{2} \sin Ht$$

the voltage at the movable contact of potentiometer 38 referenced to ground becomes $$\frac{E}{2}\left(\sin Ht + \frac{Vw}{Vt} \sin Hw\right)$$

and feeds this output on lead 70 to network box 71 of servo amplifier 72. In a similar manner $$\frac{E}{2}\left(\cos Ht + \frac{Vw}{Vt} \cos Hw\right)$$

is produced at the movable contact of wind force potentiometer 39 and feeds this output on lead 73 to network 74 of servo amplifier 75.

$$\sin Ht + \left(\frac{Vw}{Vt}\right) \sin Hw$$

is the longitudinal or east-west component of linear ground velocity, $Vg$, divided by $Vt$, and $$\cos Ht + \left(\frac{Vw}{Vt}\right) \cos Hw$$

is the latitudinal or north-south component of $Vg$ divided by $Vt$. The purpose of division by $Vt$ is to produce a variable scale of computations, which provides high accuracy at low values of $Vt$. The effect of this division is subsequently cancelled in the course of integration through multiplication by $Vt$.

Since the linear distance between meridians of longitude decreases as the cosine of the latitude, the angular change in longitude can be computed from the longitudinal ground velocity multiplied by the secant of latitude. Sec Lap is computed by inverting cos Lap. Accordingly, servo motor 76 controlled by amplifier 72 positions a movable contact on potentiometer 77 at the outer terminals of which a variable reference voltage $$\frac{E}{2} \cos Lap$$

is impressed. The potentiometer 77 is connected to the network 71 by feedback line 78 and is employed to null its input $$\frac{E}{2}\left(\sin Ht + \frac{Vw}{Vt} \sin Hw\right)$$

Because the mechanical input to linear potentiometer 77 on shaft 80 that is required to produce any fixed voltage level is inversely proportional to the potentiometer excitation and because the potentiometer excitation is equal to $$\frac{E}{2} \cos Lap$$

the servo motor output required to satisfy the network input is proportional to $$\left(\sin Ht + \frac{Vw}{Vt} \sin Hw\right) \sec Lap$$

This function is employed to drive the carriage of integrator 82.

A conventional closed loop servo is formed by network box 74, amplifier 75, motor 83 and potentiometer 84 which is excited by a constant $$\frac{E}{2}$$

volts from resolver 86 the rotor position of which is fixed. The servo 83 output shaft 82$^a$ drives the movable potentiometer contact 86$^a$ such that the output of the network box is nulled, producing $$\frac{E}{2}\left(\cos Ht + \frac{Vw}{Vt} \cos Hw\right)$$

at movable the contact of potentiometer 84 and therefore at the carriage of integrator 85.

The discs of the integrator 82 and of the integrator 85 are driven by a unique integrator system comprising the mechanical ball-and-disc integrator 54, the disc of which is driven by a constant speed motor 88 energized through line 89 by precision oscillator and amplifier 87. The amplifier unit 87 is supplied by power supply 87$^a$. The output of the motor 88 is used to drive the disc of the integrator 54 and is fed as one input to differential 90. The ratio in gear train 92 is fixed so that the value of the fixed speed input to differential 90 becomes $325t$. The integrator output comprises the other input to the differential 90. By virtue of the proper setting of gear train 91 on shaft 52 the integrator carriage is actually positioned by $Vt-325$ where 325 is an offset, equal to the mean value of $Vt$ between operational limits, and is introduced to utilize full movement of the carriage. It thereby improves the accuracy of the device for small values of $Vt$ which would otherwise position the carriage near the center of the disc at which operative position diminished accuracy normally results. The integrator 54 output is $(Vt-325)t$. The $-325t$ term is subsequently canceled by the addition of $325t$ at differential 90, and thereby producing at the output differential 90 $Vt \cdot t$. The differential output $Vt \cdot t$ is transmitted on shaft 93 to drive the discs of component integrators 82 and 85.

The integrator 82 output is the time integral of the rate of change of its disc input multiplied by carriage position and may be written $$(6) \quad \Delta Lo = \int \left[\left(\sin Ht + \frac{Vw}{Vt} \sin Hw\right)\right] \sec Lap \, Vt \cdot tdt$$

In a similar manner, the output of integrator 85 may be written (7) $\Delta La = \int \left[ \left( \cos Ht + \frac{Vw}{Vt} \cos Hw \right) \right] Vt \cdot t dt$ Integrator 82 output ($\Delta Lo$) drives synchro transmitter 95 which transmits ($\Delta Lo$) through switch 96 controlled by relay 97 to synchro receiver 98, the mechanical output of which comprises one input to differential 100. Initial longitude (Loi) generated by slew switch 101 controlling motor 102 comprises the second input to differential 100, the output of which, therefore, becomes (8) $\quad Lop = \Delta Lo + Loi$ This present longitude (Lop) drives present position counter 103 and synchro transmitters 104 and 105 at 360° and 360°/25 values respectively for transmission of present longitude to dependent equipment. It is to be noted that selection of change of position or locking circuits through relay 97 is controlled by a departure switch external to the system which is connected to the relay 97 by lead 97ª. This control permits maintenance of present position data on counters until aircraft is airborne and generating change of position.

Integrator 85 output ($\Delta La$), drives synchro transmitter 106 which transmits ($\Delta La$) through switch 107 controlled by relay 97 to synchro receiver 108, the mechanical output of which comprises one input to differential 110. Initial latitude (Lai) generated by slew switch 111 controlling motor 112 comprises the second input to differential 110, the output of which therefore becomes (9) $\quad Lap = \Delta La + Lai$ This function drives present position counter 113, resolver 114, which excites the potentiometer 77; and synchro transmitters 115 and 116 at 360° and 360°/25 values respectively for transmission of present latitude to dependent equipment.

Where radar is available the computer may be operated in the ground speed mode, the desired mode of operation being selectively controlled by relays. The quantities shown entirely in parenthesis are peculiar to the ground speed mode of operation. The coils of relay 21 and relay 120 are connected to a 28 v. D.C. source 121 by means of line 122 and switch 124 which is provided therein. When wind force knob is turned to below zero switch 124 is closed by a detent mechanism (not shown) to activate the relays 120 and 21. When the switch 43 is closed by relay 21 at ground speed mode, lead 47 is connected to lead 129 through switch 129ª which is closed by relay 120 at ground speed mode to excite synchro transmitters 125 and 130 with 26 volts. Accordingly, synchro transmitter 125 transmits ground speed, Vg, on line 126, which includes switch 127 which is closed at ground speed mode position by the relay 120, to the synchro transformer 46. The relay 21 connects the transformer 46 to the servo amplifier 44 by means of lead 48, switch 50, and lead 128 to form a closed loop system for receiving Vg synchro transmissions. The servo motor 45 output Vg positions the carriage of the integrator 54 which generates an output $Vg \cdot t$ as explained for $Vt \cdot t$ above.

Drift angle Hdr obtained by radar is fed to synchro transmitter 130 which is connected to switch 131 by line 132. The switch 131 closes the circuit between the line 132 and the lead 20 so that the quantity Hdr may be fed to the synchro differentials 18 and 32. The quantity Va+Hdr is placed on the output lead 22 of the synchro differential and placed in the synchro control transformer 23. The computation of ground track Hg is performed by the same units which computed true heading as previously described. This is achieved in accordance with the following equation:

(10) $\quad Hg = Hc + Te + Va + Hdr$

Differential 11 adds Hc+Te and Va+Hdr to yield ground track Hg to synchro differential 32 and synchro resolver 33. The synchro differential 32 also receives Hdr on lead 36 which is connected to lead 20 and computes true heading Ht for transmission to remote equipment in accordance with the following equation:

(11) $\quad Ht = Hg - Hdr$

The integrands of Equations 3 and 4 are mechanized in the same manner as for Equations 1 and 2. The potentiometers 38 and 39, are connected to receive the sine and cosine functions of ground track, Hg, from the synchro resolver 33, and their potentiometer outputs are fed to the networks 71 and 74, respectively, without modifications by the speed potentiometers as explained previously. This is due to the fact that the movable potentiometer contacts connected to leads 70 and 73 are positioned to zero when the wind force knob is turned to below zero position during ground speed mode of operation.

Servo motor 76 controlled by amplifier 72 drives the movable contact of potentiometer 77 until the networks 71 input $$\frac{E}{2} \sin Hg$$

is nulled by the voltage from potentiometer 77. The mechanical input to linear potentiometer 77 that is required to produce any fixed voltage level is inversely proportional to the potentiometer excitation. Therefore, since the potentiometer 77 excitation is proportional to $$\frac{E}{2} \cos Lap$$

the servo motor 76 mechanical output required to satisfy the network input is proportional to sin Hg sec Lap. Limit stop 136 is provided to protect the limited travel devices potentiometers 77 and integrator carriage 82.

Servo motor 83 controlled by amplifier 75 drives the moving contact of potentiometer 84 until the network 74 input $$\frac{E}{2} \cos Hg$$

is nulled by the voltage from potentiometer 84. The potentiometer excitation is constant and the servo motor 83 mechanical output is proportional to cos Hg. Limit stop 137 is provided to protect the limited travel devices potentiometers 84 and integrator carriage 85.

The discs of integrators 82 and 85 are driven by the output $Vg \cdot t$ of differential 90. Since the position of the carriage of integrator 82 satisfies the function (sin Hg sec Lap), the output of integrator 82 may be written

(12) $\quad \Delta Lo = \int \sin Hg \sec Lap \; Vg \cdot tdt$

In similar manner, the output of integrator 85 may be written

(13) $\quad \Delta La = \int \cos Hg \; Vg \cdot tdt$

When these increments are combined with initial values in the differentials 100 and 110, Equations 3 and 4 are satisfied.

What is claimed is:

1. A navigation computer for determining present position by combining initial position with increments of position and having more than one mode of operation comprising first means for introducing compass heading Hc to said computer, second means for selectively introducing magnetic variation Va or magnetic variation Va plus drift angle Hdr to said computer, identical means connected to said first and second introducing means for selectively producing true heading Ht or ground track Hg depending on the mode of operation, means connected to said last mentioned means for resolving the true heading or ground track into their cosine and sine functions, third means for selectively introducing air speed $Vt$ or ground speed $Vg$ to said computer, fourth means for introducing wind force $Vw$ to said computer, voltage dividing means connected to the output of said resolving means for receiving said functions and to said third and fourth introducing means, fifth means for introducing wind direction $Hw$ to said computer, a second resolving means connected to said fifth introducing means and said voltage dividing means for resolving wind direction $Hw$ into its sine and cosine components, a pair of disc and carriage integrators, a cosine resolver connected to receive the latitude of present position which is generated in the output of said computer, a secant resolver responsive to said voltage dividing means and to said cosine resolver, the carriage of one of said integrators being positioned in accordance with the output of said secant resolver, means responsive to the output of said voltage dividing means for positioning the carriage of the other of said integrators, a multiplying device, means for generating a quantity proportionate to time, said third introducing means and the time quantity generating means being in driving connection with said multiplying device, said multiplying device being in disc driving connecton with each of said integrators, means for introducing quantities representing initial position of latitude and longitude to said computer means for adding latitude of initial position to the output of one of said integrators and for yielding to the computer output latitude of present position and means for adding initial position of longitude to the output of the other of said integrators and yielding to the computer output longitude of present position.

2. A secant resolver as claimed in claim 1 comprising a servo loop including an adding network, a servo amplifier connected to said adding network, a servo motor controlled by said amplifier, a potentiometer having a moving contact positioned by said servo motor, means for impressing a variable voltage representing a cosine function across said potentiometer, said contact being connected to one leg of said network, a voltage source connected to the other leg of said network, whereby the output of said servo motor yields a secant function when the voltage input in said zero loop is nulled.

3. A navigation computer as claimed in claim 1 wherein said multiplying device is a third disc and carriage integrator, said time quantity generating means being employed to drive the disc of said third integrator and said third introducing means is employed to position the carriage of said integrator and there is provided a differential in the disc driving connection between said third integrator and the first mentioned pair of integrators, one input side of said differential being driven in accordance with the output of said third integrator, the other input side of said differential being driven by said time quantity generating means and the output of said differential being employed to drive the disc of the first mentioned pair of integrators.

References Cited in the file of this patent

UNITED STATES PATENTS

| | | |
|---|---|---|
| 2,406,836 | Holden | Sept. 3, 1946 |
| 2,652,979 | Chance | Sept. 22, 1953 |
| 2,752,091 | McKenney | June 26, 1956 |

OTHER REFERENCES

Product Engineering ("Mechanical Computing Mechanisms-III"), by Reid and Stromback, pages 128 and 129, October 1949.

Product Engineering ("Servo Systems for Performing" by Wall) page 137, September 1953.